United States Patent

Lin

[11] Patent Number: 6,131,505
[45] Date of Patent: *Oct. 17, 2000

[54] DUAL-USE ROASTER

[76] Inventor: Yu-Yuan Lin, No. 72-1, Hsin-Le Rd., Tainan City, Taiwan

[ * ] Notice: This patent is subject to a terminal disclaimer.

[21] Appl. No.: 09/471,826

[22] Filed: Dec. 23, 1999

[51] Int. Cl.[7] ............................. A47J 37/00; A47J 37/04; A47J 37/07
[52] U.S. Cl. ......................... 99/340; 99/341; 99/421 H; 99/446; 99/450; 403/386
[58] Field of Search ................ 99/339–341, 419–421 V, 99/400, 401, 444–446, 447–450, 481, 482; 126/25 R, 9 R, 41 R, 25 AA; 219/403, 404, 386, 400; 426/523, 466

[56] References Cited

U.S. PATENT DOCUMENTS

| | | | |
|---|---|---|---|
| 3,113,504 | 12/1963 | Reed | 99/421 H |
| 3,247,827 | 4/1966 | Cremer | 99/421 H |
| 3,733,999 | 5/1973 | Bernstein | 99/339 X |
| 4,598,690 | 7/1986 | Hsu | 126/25 R |
| 4,810,856 | 3/1989 | Jovanovic | 219/401 |
| 4,924,766 | 5/1990 | Hitch | 99/421 HV |
| 5,195,425 | 3/1993 | Koziol | 99/447 X |
| 5,333,540 | 8/1994 | Mazzocchi | 99/450 X |
| 5,421,318 | 6/1995 | Unruh et al. | 126/9 R |
| 5,536,518 | 7/1996 | Rummel | 426/523 |
| 5,649,475 | 7/1997 | Murphy et al. | 99/421 H |
| 5,819,639 | 10/1998 | Spell | 99/446 X |
| 5,832,811 | 11/1998 | King | 99/419 X |
| 5,934,180 | 8/1999 | Lin . | |

*Primary Examiner*—Timothy Simone
*Attorney, Agent, or Firm*—Rodman & Rodman

[57] ABSTRACT

A dual-use roaster includes a housing having a receiving space and a peripheral rim, a first heater disposed inside the receiving space, a rotatable spit assembly mounted on the housing for supporting food items inside the receiving space, and a tray assembly including a tray panel for supporting food items, a peripheral downward flange mounted detachably on the peripheral rim of the housing, and a second heater disposed beneath the tray panel.

3 Claims, 8 Drawing Sheets

DUAL-USE ROASTER

BACKGROUND OF THE INVENTION

1. Field of the Invention

This invention relates to a roaster for roasting food items, more particularly to a dual-use roaster having a spit assembly and a grilled tray assembly that can be used selectively for supporting food items.

2. Description of the Related Art

Conventionally, roasting or baking of food items is done either on tray-type roasters or oven-type roasters. FIG. 1 shows a conventional tray-type roaster 1 which includes a base 11 and a tray 12 on top of the base 11. The tray 12 has an electric heater(not shown) provided therein for cooking food items placed on the tray 12. This type of roaster has a limited space that can only accommodate small food items, such as sliced meat or vegetables. In addition, the food items are in direct contact with the hot surface of the tray 12 during roasting. On the other hand, an oven-type roaster provides a large space to accommodate big or thick food items, such as a chicken or potatoes, and allows the big food items to be heated in a closed space.

Accordingly, these two types of roasters are purposed differently for cooking different food items. Due to the different purposes, the two types of roasters can not be used interchangeably. Therefore, one must have both roasters in order to cook different food items. There is a need for more space to store or place two types of roasters in a house.

SUMMARY OF THE INVENTION

Therefore, it is an object of the present invention to provide a dual-use roaster to eliminate the need to have two kinds of roasters.

Accordingly, the dual-use roaster of the present invention comprises: a housing having a top opening, a bottom, and a peripheral side wall extending upward from the bottom to confine a receiving space; a lid assembly mounted on the housing for covering the top opening; a spit assembly mounted detachably on the peripheral side wall to extend across the receiving space; a first heater provided inside the receiving space; a first electrical connector mounted on the housing outwardly of the receiving space and connected electrically to the first heater; and a tray assembly including a tray panel, a second heater disposed at a bottom side of the tray panel, and a second electrical connector connected electrically to the second heater and mounted on the tray panel, the tray panel being mounted detachably on the housing at the top opening of the housing.

BRIEF DESCRIPTION OF THE DRAWINGS

In drawings which illustrate an embodiment of the invention.

DETAILED DESCRIPTION OF THE PREFERRED EMBODIMENT

Figure 1:
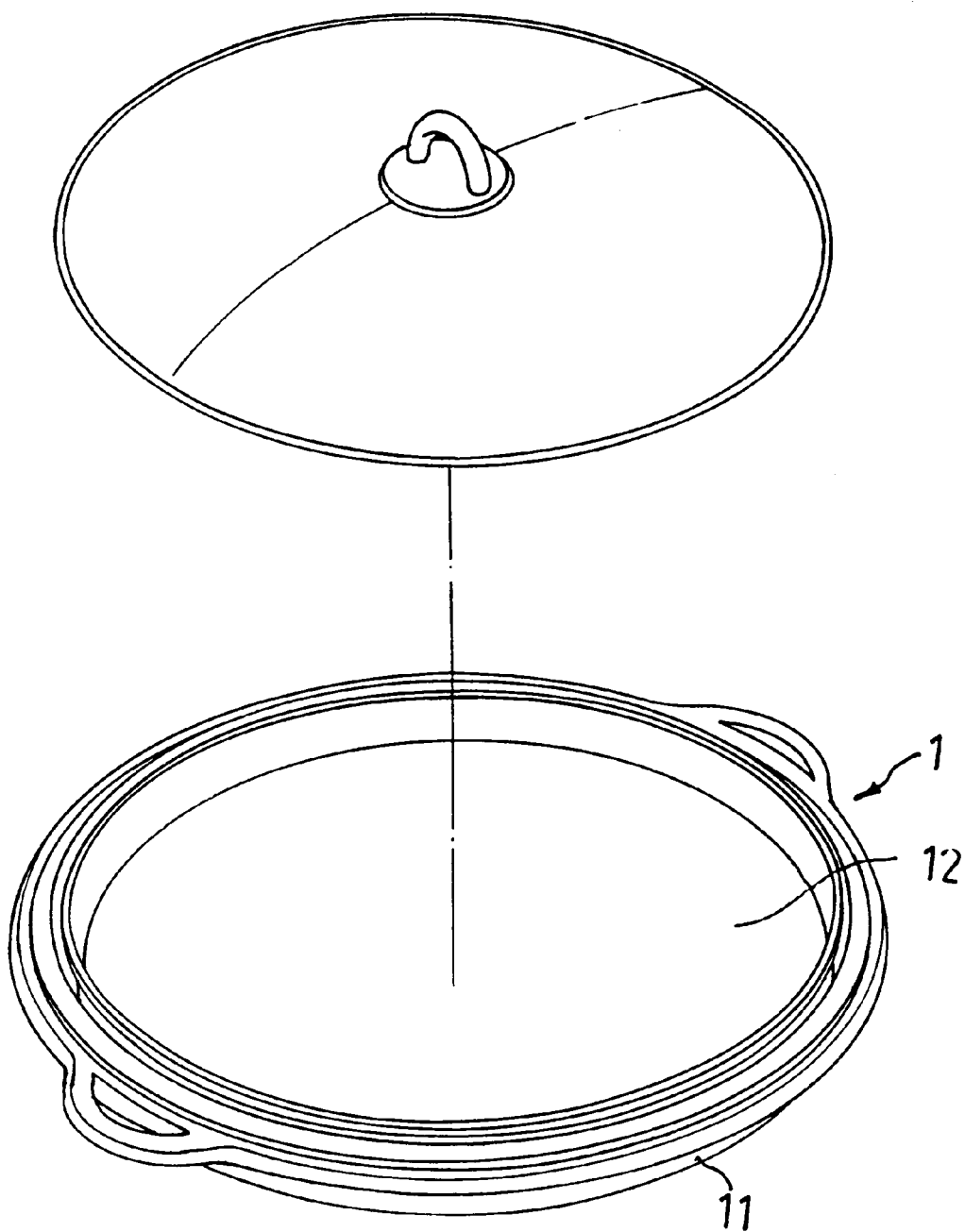
FIG. 1 illustrates a conventional tray-type roaster.
Figure 2:
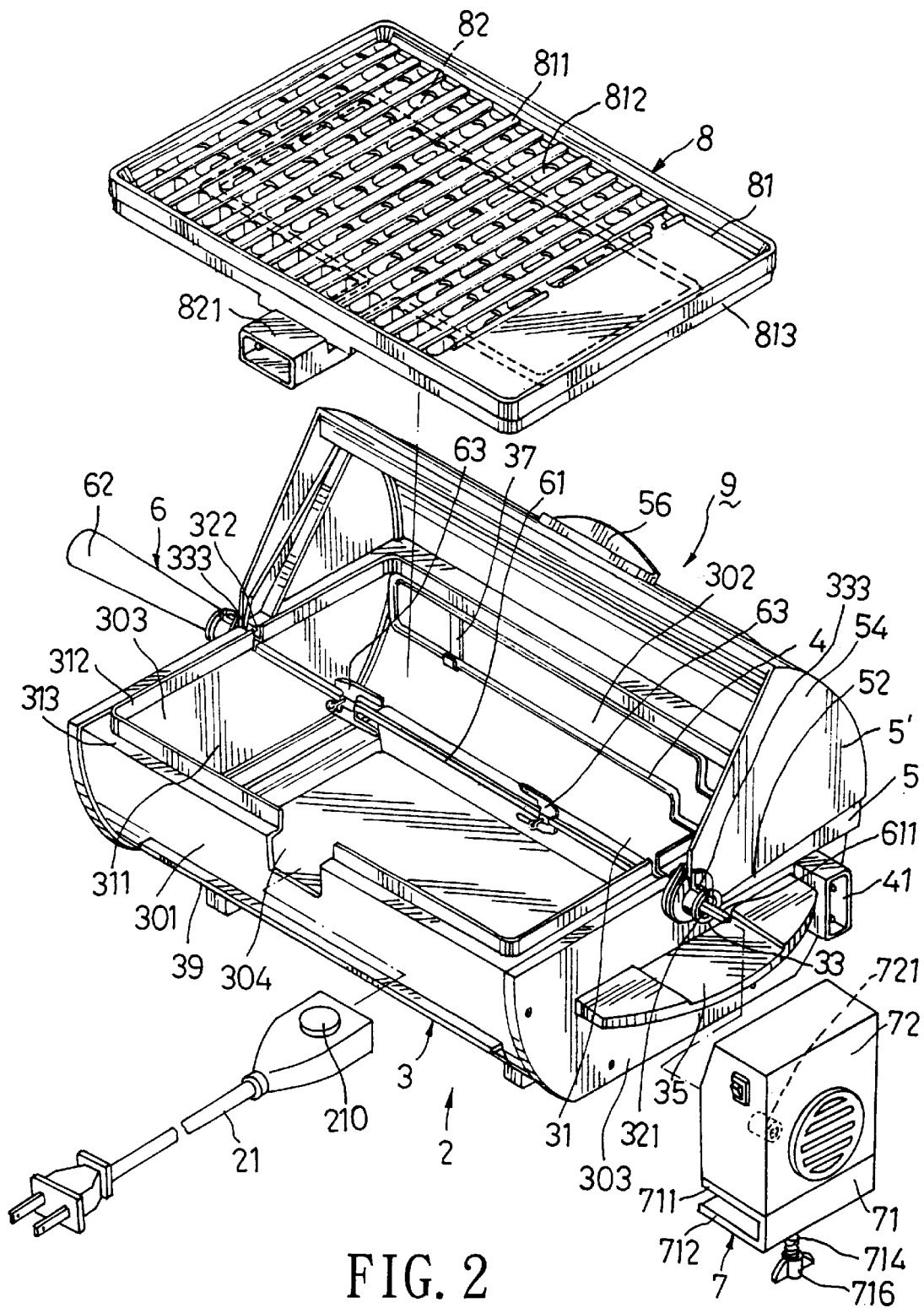
FIG. 2 is an exploded perspective view of the dual-use roaster of the present invention.
Figure 3:
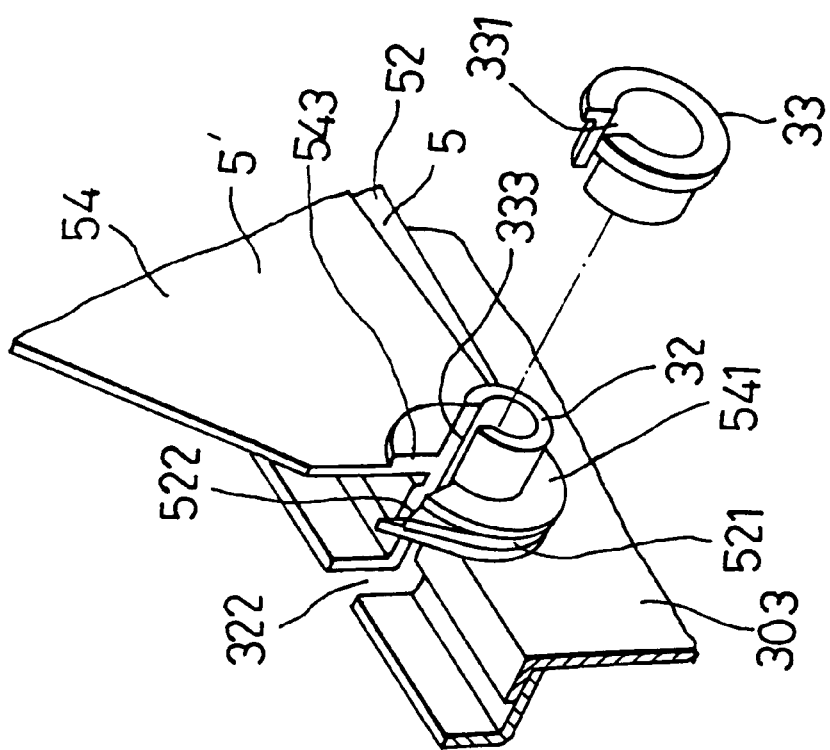
FIG. 3 shows a detailed connection between the lid assembly and the housing of the dual-use roaster of FIG. 2.
Figure 4:
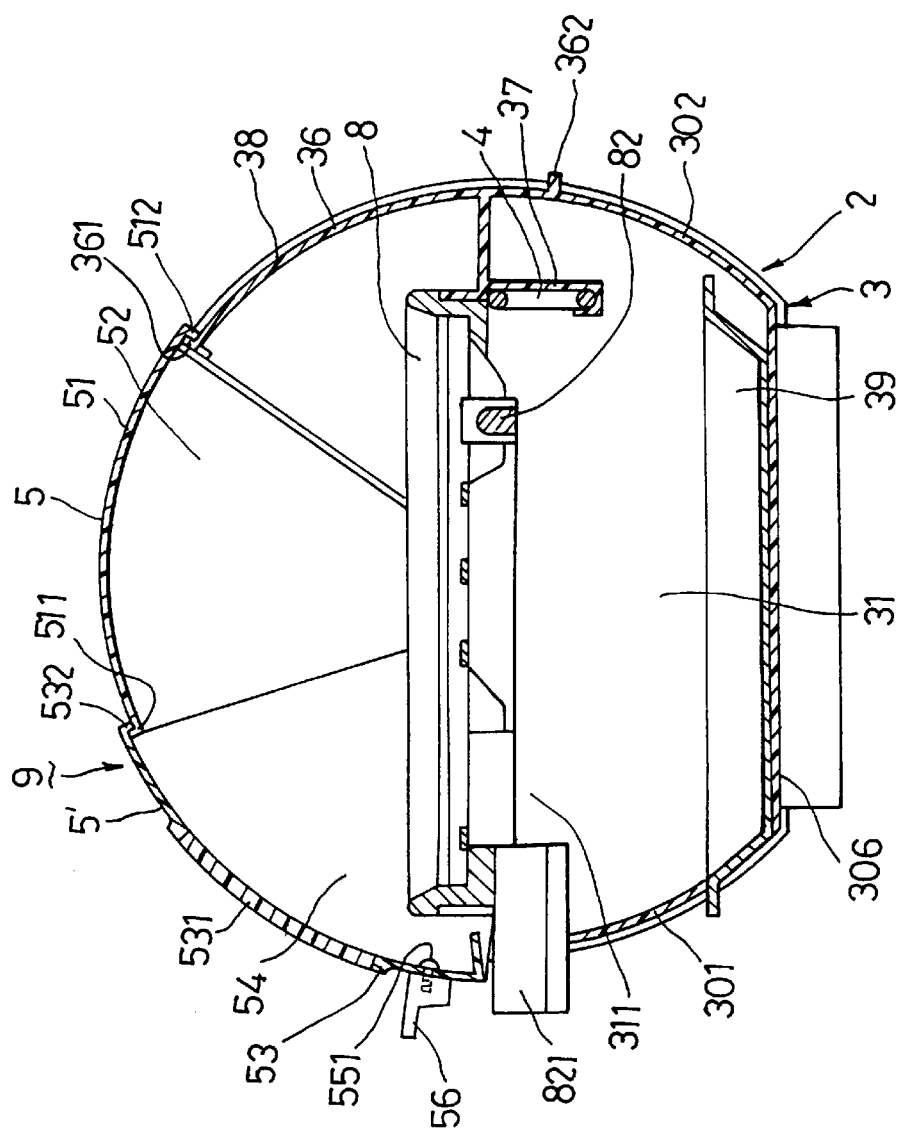
FIG. 4 illustrates a cross-sectional view of the dual-use roaster of FIG. 2 with the lid assembly in a closed position.

FIGS. 2 to 4 show a dual-use roaster 2 embodying the present invention. The dual-use roaster 2 includes a housing 3 having a receiving space 31 confined by a front wall 301, a rear wall 302, a pair of opposite side walls 303, a bottom 306, a slidable collecting tray 39 which is disposed on the bottom 306 and which can be drawn forward and outward, and a top opening 311 to access the receiving space 31. A first heater 4 is disposed inside the receiving space 31 adjacent to the rear wall 302, and is connected to a first electrical connector 41 which projects outward from one of the side walls 303. The heater 4 is suspended by a hanger 37 attached to the rear wall 302. A pair of opposite studs 32, which are annular in shape, project outward from the top portion of the two side walls 303 respectively.

A spit assembly 6 extends across the receiving space 31 and has a rod 61 extending through the two opposite studs 32, a spit handle 62 mounted on one end of the rod 61, and a pair of forks 63 mounted detachably on the rod 61 between the two opposite side walls 303. Each of the two opposite studs 32 has a notch 333 which opens upward for mounting the spit assembly 6 and which is aligned with a trough 322 formed in the corresponding side wall 303.

The housing 3 further includes a rounded stationary cover 36 extending upward from the top of the rear wall 302 and from a portion of the side walls 303 to cover a portion of the top opening 311 of the housing 3. The stationary cover 36 includes a curved cover member 38 extending upward from the rear wall 302. A lid assembly 9 includes a first lid member 5 adjacent to the stationary cover 36, and a second lid member 5' adjacent to the first lid member 5.

As illustrated in FIGS. 3 and 4, the first lid member 5 has a first curved slide wall 51, and two opposite first side slide walls 52 extending downward from the first curved slide wall 51. The second lid member 5' has a second curved slide wall 53 and two opposite second side slide walls 54 extending downward from the second curved slide walls 53. The first and second side slide walls 52, 54 include first and second hook portions 521, 541 mounted pivotally and respectively on the two opposite studs 32, to allow the lid assembly 9 to turn about the studs 32 between an opened position (see FIG. 2) and a closed position (see FIG. 4). The first and second hook portions 521, 541 have first and second mouth portions 522, 543 adjacent to the corresponding notches 333 formed in the two studs 32. The first and second mouth portions 522, 543 are aligned respectively with the notches 333 of the studs 32 for mounting the spit assembly 6 when the lid assembly 9 is in an open position.

Each of the studs 32 is mounted with a sleeve 33 on one end for positioning the first and second hook portions 521, 541 on the studs 32. Each of the sleeves 33 includes a slit portion 331 and is turnable about the corresponding stud 32. When each slit portion 331 is turned to be aligned with the corresponding mouth portions 522, 543 and the notch 333, the spit assembly 6 can be mounted horizontally on the housing 3 by extending the former in the aligned slit portions 331, the mouth portions 522, 543, and the notches 333.

Figure 6:
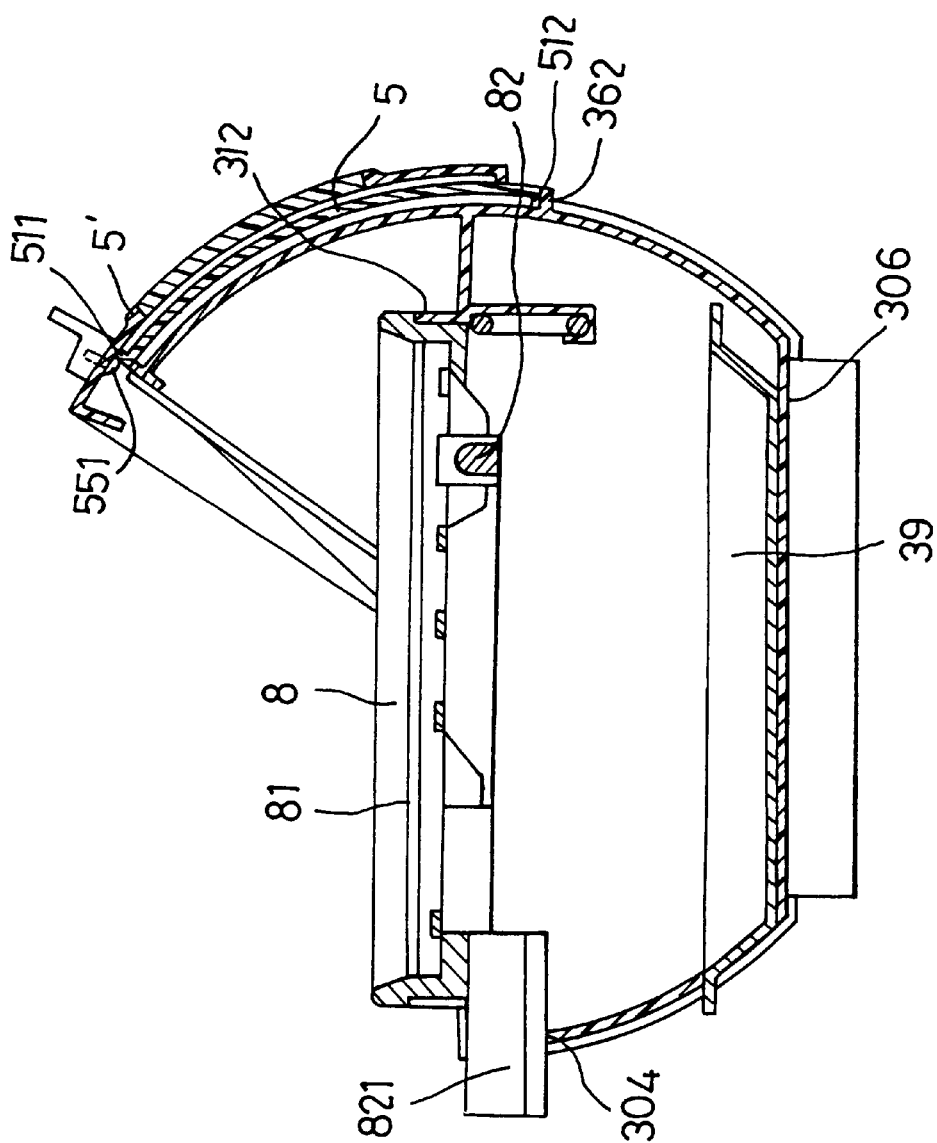
FIG. 6 illustrates a cross-sectional view of the dual-use roaster of FIG. 2 with the lid assembly in an opened position.

As illustrated in FIG. 4, the curved cover member 38 includes a first upward end flange 361 on one end. A stopper 362 is disposed on the top portion of the rear wall 302 below the first upward end flange 361. The first curved slide wall 51 includes a second upward end flange 511 on one end, and a first downward end flange 512 on the other end. The second curved slide wall 53 includes a second downward end flange 532 on one end, and a bolt 551 screwed on the other end to fix a lid handle 56 on the second lid member 5'. The first upward and downward end flanges 361, 512 engage one another, and the second upward and downward end flanges 511, 532 engage one another, when the lid assembly 9 is slid to the closed position (see FIG. 4). As shown in FIG. 6, the first downward end flange 512 is slid over the stationary cover 36 until it reaches the stopper 362, and the bolt 551 is stopped by the second upward end flange 511, when the lid assembly 9 is in the opened position. The second curved slide wall 53 has a transparent window 531 provided therein to permit viewing of the roasting condition of the food items from the outside of the housing 3 even though the lid assembly 9 is in the closed position.

Figure 5:
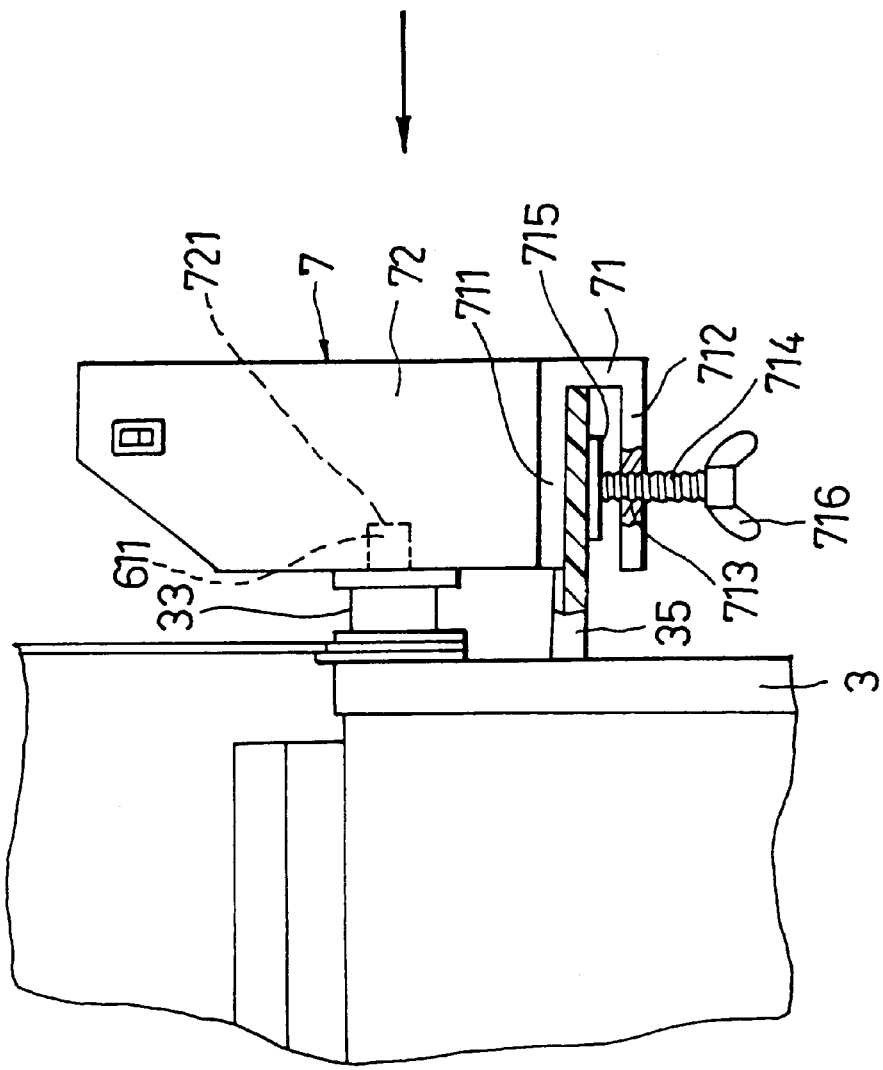
FIG. 5 shows a detailed connection between the driving means and the housing of the dual-use roaster of FIG. 2.

As illustrated in FIGS. 2 and 5, the dual-use roaster further includes a bracket plate 35 projecting outward from one of the side walls 303, and driving means 7 mounted on the bracket plate 35. The driving means 7 includes a motor base 71 and a motor assembly 72 disposed on the motor base 71. The motor base 71 includes an upside plate 711 and an underside plate 712 spaced apart from the upside plate 711. The underside plate 712 has a screw hole 713 for receiving a screw rod 714 having a screw head 716. A clamp plate 715 disposed on the tail end of the screw rod 714 for clamping the motor base 71 onto the bracket plate 35 by turning the screw rod 714 to move the clamp plate 715 toward the bracket plate 35. The motor assembly 72 includes a driving part 721 to receive a connecting end 611 of the rod 61 of the spit assembly 6. The portions of the rod 61 received in the two opposite studs 32 preferably have a circular cross-section for achieving a smooth rotation, while the remaining portions of the rod 61 can have a rectangular cross-section.

Figure 7:
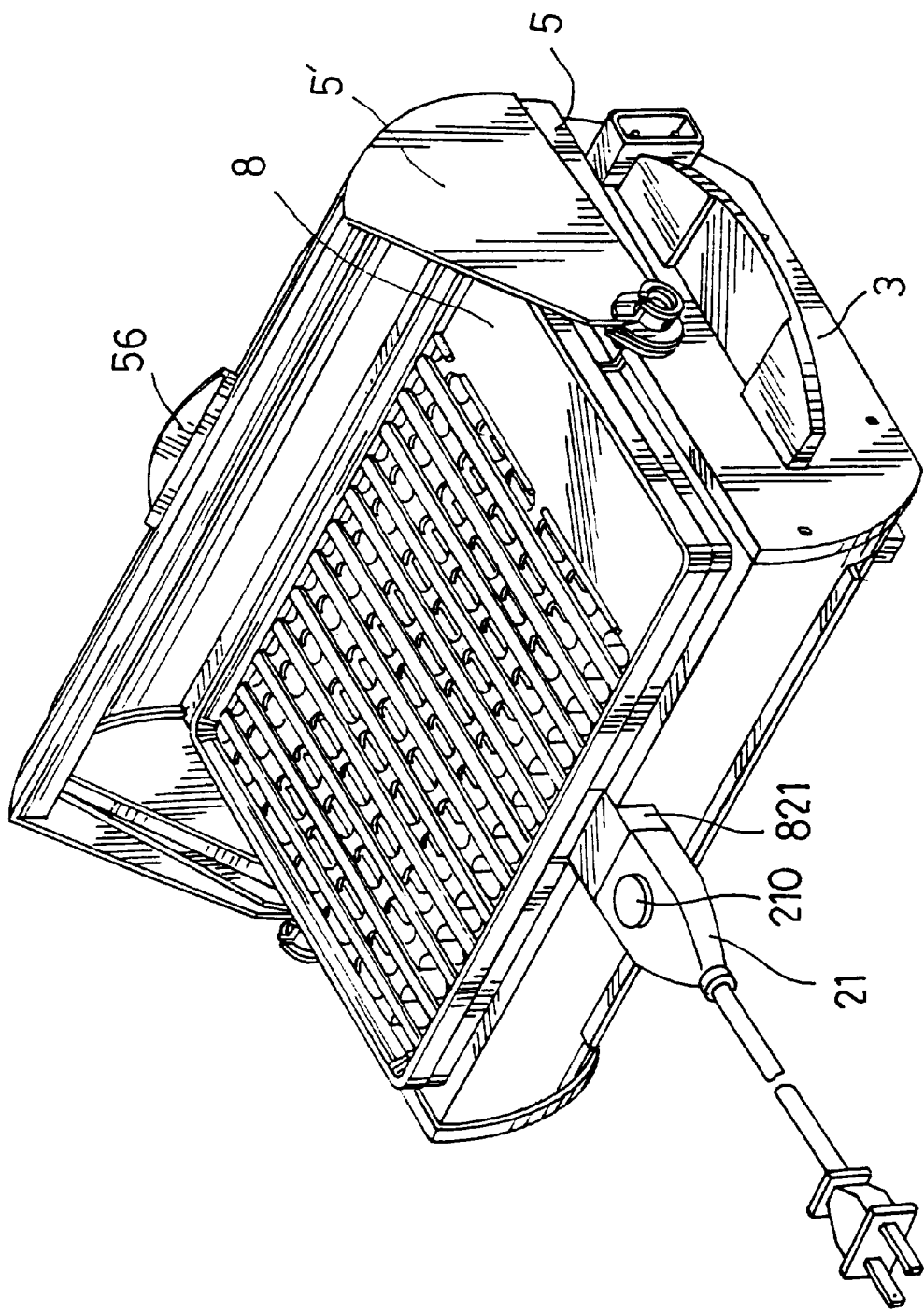
FIG. 7 shows the dual-use roaster of FIG. 2 with the tray assembly mounted thereon.

As illustrated in FIGS. 2 and 7, the housing 3 further includes a peripheral shoulder 313 extending along the top ends of the front, rear, and side walls 301, 302, 303, a peripheral rim 312 raised from the peripheral shoulder 313 to confine the top opening 311, and a cutout 304 disposed in the front side wall 301.

A tray assembly 8 includes a tray panel 81 having drip holes 812, a grill 811 disposed above the tray panel 81, and a second electric heater 82 disposed at the bottom side of the tray panel 81 and connected electrically to a second electrical connector 821. The tray panel 81 further includes a peripheral downward flange 813 adapted to be positioned by the peripheral rim 312 of the housing 3 for mounting the tray assembly 8 on the dual-use roaster 2.

As shown in FIG. 7, the dual-use roaster 2 is ready to serve upon electrically connecting the second heater 82 to an electrical power source via the second electrical connector 821 and an electric plug connector 21. During use, food items are laid on the grill 811 for roasting, while oil or grease released from the food items drip through the drip holes 812 for collection in the collecting tray 39.

Figure 8:
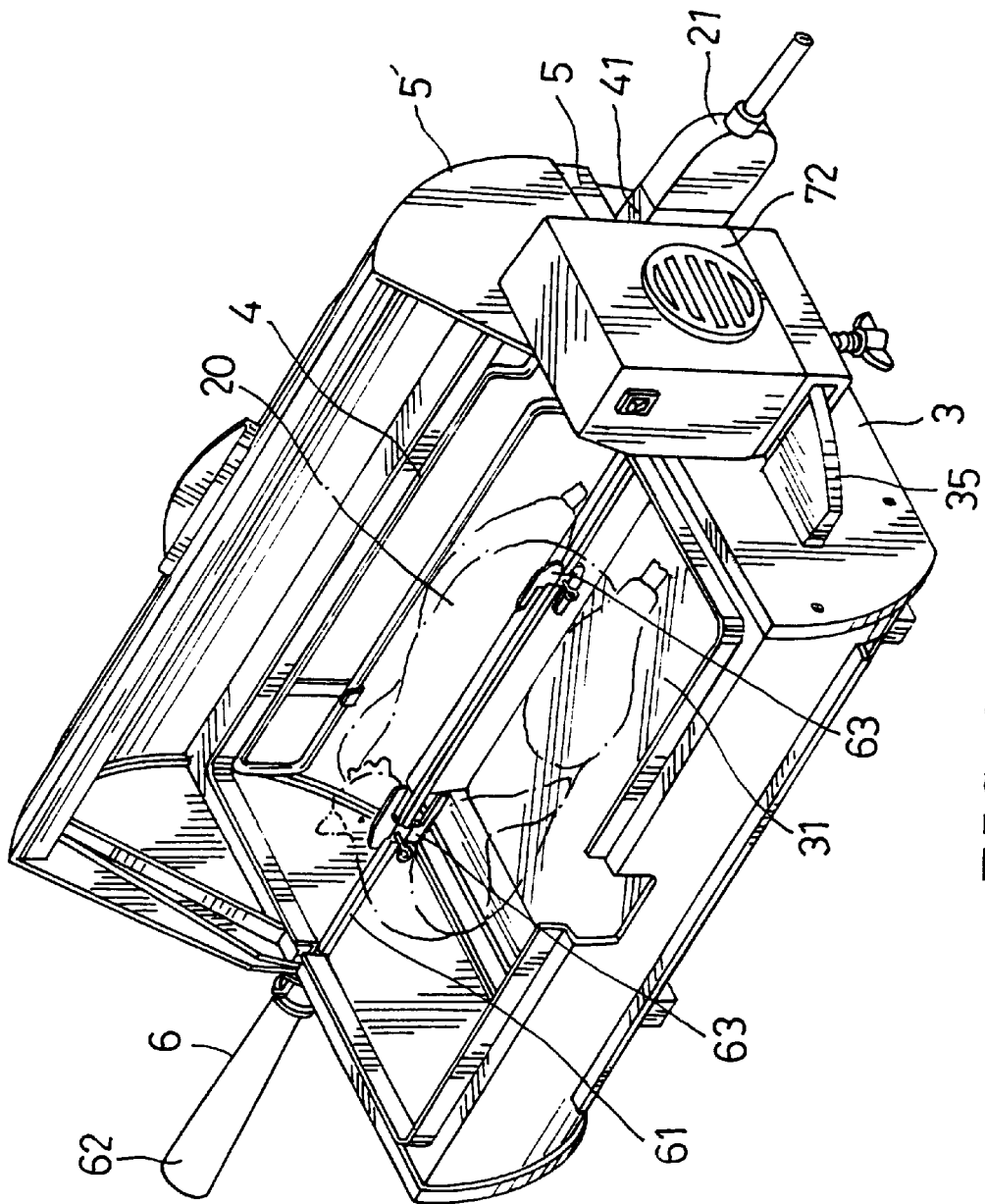
FIG. 8 shows the dual-use roaster of FIG. 2 with the tray assembly removed therefrom.

As shown in FIGS. 2 and 8, when the food item for roasting is a chicken 20, the tray assembly 8 is dismounted from the housing 3, and the chicken 20 is mounted on the spit assembly 6 and is fixed by the two opposite forks 63. With the slit portions 331 of the sleeves 33 being turned to align with the notches 333 of the studs 32 and the mouth portions 522, 543 of the hook portions 521, 541, the spit assembly 6 having the chicken 20 mounted thereon can be placed horizontally across the receiving space 31. The slit portions 331 of the sleeves 33 are turned away from the notches 333 to prevent the spit assembly 6 from being released accidentally. The dual-use roaster 2 of this invention forms a large opening between the lid assembly 9 and the housing 3 when the first and second lid members 5, 5' are opened, thereby facilitating the mounting and dismounting of the spit assembly 6 which carries a large volume of food, such as a chicken, thereon via the receiving space 31 and the top opening 311 thereof.

The first and second electrical connectors 41, 821 are of the same dimension. The electrical plug connector 21 is connectable selectively to the first and second electrical connectors 41, 821 so that the dual-use roaster 2 of this invention can serve as a rotisserie when the electrical plug connector 21 is connected to the first electrical connector 41 and as a grill when the electrical plug connector 21 is connected to the second electrical connector 821. The electrical plug connector 21 is provided with a thermostat 210 so as to control heating rates of the first and second heaters 4, 82.

The spit assembly 6 can be rotated by operating manually the handle 62 or by actuating the motor assembly 72. The chicken 20 is uniformly heated by the first heater 4 as it is rotated.

The use of the sleeves 33 in the dual-use roaster 2 of the present invention is optional. The sleeves 33 can be dispensed with if the studs 32 have sufficient length projecting outward from the side walls 303 to prevent the lid assembly 9 from moving away from the housing 3.

The dual-use roaster of the present invention can adapt a timer (not shown)for controlling the electric power, the motor assembly 72 and the first and second heaters 4, 82.

With the invention thus explained, it is apparent that various modifications and variations can be made without departing from the spirit of the present invention. It is therefore intended that the invention be limited only as recited in the appended claims.

I claim:
1. A dual-use roaster comprising:
a housing having a top opening, a bottom, and a peripheral side wall extending upward from said bottom to confine a receiving space;
a lid assembly mounted on said housing for covering said top opening;
a spit assembly mounted detachably on said peripheral side wall to extend across said receiving space;
a first heater provided inside said receiving space;
a first electrical connector mounted on said housing outwardly of said receiving space and connected electrically to said first heater;
a tray assembly including a tray panel, a second heater disposed at a bottom side of said tray panel, and a second electrical connector connected electrically to said second heater and mounted on said tray panel, said tray assembly being mounted detachably on said peripheral side wall, said first and second electrical connectors being of the same dimension; and
an electrical plug connector connectable selectively to said first and second electrical connectors.
2. A dual-use roaster comprising:
a housing having a top opening, a bottom, and a peripheral side wall extending upward from said bottom to confine a receiving space;
a lid assembly mounted on said housing for covering said top opening;
a spit assembly mounted detachably on said peripheral side wall to extend across said receiving space;

a first heater provided inside said receiving space;

a first electrical connector mounted on said housing outwardly of said receiving space and connected electrically to said first heater;

a tray assembly including a tray panel, a second heater disposed at a bottom side of said tray panel, and a second electrical connector connected electrically to said second heater and mounted on said tray panel, said tray assembly being mounted detachably on said peripheral side wall, said first and second electrical connectors being of the same dimension; and an electrical plug connector connectable selectively to said first and second electrical connectors, said electrical plug connector being provided with a thermostat for controlling heating rates of said first and second heaters.

3. A dual-use roaster comprising:

a housing having a top opening, a bottom, and a peripheral side wall extending upward from said bottom to confine a receiving space, said housing further having two studs disposed on said peripheral side wall at said top opening on two opposite sides of said receiving space, said studs having notches which open upward and which are aligned along the direction of said spit assembly, said spit assembly being mounted horizontally on said studs via said notches;

a lid assembly mounted on said housing for covering said top opening;

a spit assembly mounted detachably on said peripheral side wall to extend across said receiving space;

a first heater provided inside said receiving space;

a first electrical connector mounted on said housing outwardly of said receiving space and connected electrically to said first heater; and a tray assembly including a tray panel, a second heater disposed at a bottom side of said tray panel, and a second electrical connector connected electrically to said second heater and mounted on said tray panel, said tray assembly being mounted detachably on said peripheral side wall.

* * * * *